United States Patent

[11] 3,540,365

[72] Inventors Sunao Ishizaka,
 Tokyo,
 Shigeo Ono, Yokohama-shi, Japan
[21] Appl. No. 710,920
[22] Filed March 6, 1968
[45] Patented Nov. 17, 1970
[73] Assignee Mippon Kogaku K. K.,
 Tokyo, Japan,
 a corporation of Japan
[32] Priority March 9, 1967
[33] Japan
[31] 42/19,938; 42/19,939

[54] DEVICE FOR ELEVATING AND LOWERING A REFLECTING MIRROR IN A SINGLE LENS REFLEX CAMERA
8 Claims, 8 Drawing Figs.
[52] U.S. Cl. .............................................. 95/42
[51] Int. Cl. ...................................................... G03b 19/12
[50] Field of Search ........................................... 95/42

[56] References Cited
UNITED STATES PATENTS
2,352,177 6/1944 Bolsey ........................... 95/42
3,093,044 6/1963 Lederer ......................... 95/42

FOREIGN PATENTS
877,542 4/1953 Germany ...................... 95/42
1,218,284 6/1966 Germany ...................... 95/42
1,231,111 12/1966 Germany ...................... 95/42
1,232,014 1/1967 Germany ...................... 95/42
884,458 12/1961 Great Britain ................ 95/42

Primary Examiner—John M. Horan
Assistant Examiner—Richard M. Sheer
Attorney—Anton J. Wille ABSTRACT: A mirror mechanism is disclosed for raising and lowering the viewing mirror of a single lens reflex camera wherein photometric measurements are made through the camera lens. A plate is pivoted on a shaft within the camera body and the viewing mirror is slidably mounted on this support plate. Through guide cam means, the mirror is translated relative to the support plate to retract the forward or lower edge of the mirror as the support plate is pivoted between the viewing and raised positions of the mirror thus avoiding any interference with lens mounting. Both the plate and the mirror are formed with openings which are aligned when the mirror is in its lowered or viewing position to permit photometric measurements to be made. The openings are closed due to the relative translation of the mirror when the mirror is in its raised position to block out any extraneous light entering the eyepiece of the viewfinder.

DEVICE FOR ELEVATING AND LOWERING A REFLECTING MIRROR IN A SINGLE LENS REFLEX CAMERA

This invention relates to an improvement of the device for elevating and lowering a reflecting mirror in a single lens reflex camera.

In conventional reflex cameras, the mirror housing within the camera body is made quite large due to the range of movement of the viewing mirror in pivoting from its viewing position to its upper or exposure position. It has been noted in cameras of the interchangeable lens type, that the use of lenses having a short back focus caused some interference with the movement of the mirror. There has been proposed arrangements wherein a fixed shaft is not used for pivoting the mirror, the mirror being moved by cams and links so that the front edge of the mirror is retracted during its movement to avoid the rear end of the lens mounting. It has been found however, that for the correct positioning of the viewing mirror it is necessary that the mirror be pivoted on a fixed support or shaft.

In addition to the above, there has been known instances in which photometric measurements are made through the lens, wherein the mirror is made semitransparent, or partially transparent, that extraneous light entering the eyepiece of the viewfinder enters the mirror housing during exposure thus requiring special shielding arrangements. Various proposals have been made in the past to provide shielding arrangements but these have required independent drives, or complicated arrangements, or large space requirements due to the amount of movement of the mirror and it associated accessories.

An object of this invention is to overcome the aforementioned drawbacks and provide a mirror driving mechanism, particularly for a single lens reflex camera of the interchangeable lens type wherein photometric measurements are made through the lens, with provisions for retracting the forward or lower edge of the viewing mirror as it moves between its lower or viewing position and its upper or exposure position, and block out any extraneous light entering the eyepiece during film exposure.

In accordance with the invention, the viewing mirror is slidably supported on a plate which is pivotably mounted on a shaft fixed within the camera body. The plate is rotated by the usual mirror mechanism of the camera, the mirror being translated by a guide cam relative to the plate to withdraw or retract the lower edge of the mirror as the mirror plate is moved between its two extreme positions. Further, the mirror and its supporting plate is provided with a plurality of openings, the openings being in alignment to permit the light rays to pass therethrough and impinge on the photocell surface of an exposure meter when the mirror is in its viewing position. As the plate is moved to its upper position, the relative translation of the mirror will close the openings to seal out any light from the mirror compartment.

The present invention will be described more in detail referring to the illustrative embodiments of the present invention shown in the attached drawing, in which.

Figure 1:
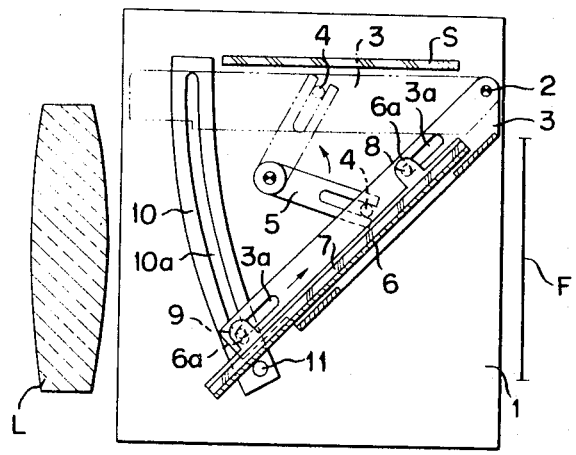
FIG. 1 is a vertical cross-sectional view of a first embodiment of this invention of a device for elevating or lowering a reflecting mirror, the mirror being in its lower or viewing position.

Referring now to FIG. 1 wherein the first embodiment of this invention is illustrated, the reference character L designates an objective lens mounted on the camera, only a portion of a wall 1 being illustrated of the camera body, while the reference character S designates a viewing plate and F the film. Fixed in the camera walls is a shaft 2 pivotally supporting a plate 3.

Figure 2:
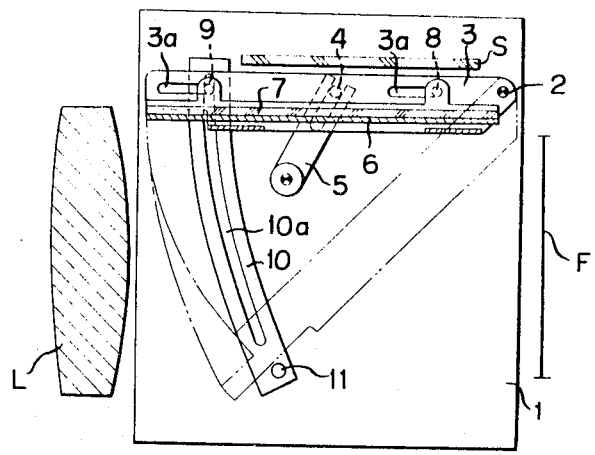
FIG. 2 is a vertical cross-sectional view of the first embodiment, where the mirror is at its elevated position.

The plate 3 is U-shaped when viewed from the end, the sides thereof being formed with elongated slots 3a. A driving pin 4 is fixed to the U-shaped plate 3 and is engaged by the bifurcated end of a driving lever 5. The driving lever 5 is rotatable by conventional mirror driving means (not shown) for pivoting the plate 3 from a lowered position (FIG. 1) to a raised position (FIG. 2). The length of the plate 3 is selected so that the path of movement of its free end will clear with distance to spare, any lens mount inserted into the camera body. A supporting plate 6 is provided on the plate 5 for a viewing mirror 7; the supporting plate 6 being formed with upstanding projections in which guide pins 8 and 9 are secured. The pins 8 and 9 are received within the longitudinal slots 3a so that the mirror and support plate are slidably mounted thereon. The length of the mirror 7 is such that it projects or is extended beyond the lower edge of the plate 7, the pins 8 and 9 being in the lower ends of slots 3a as illustrated in FIG. 1.

A cam member 10 is secured to the camera wall 1, the cam member being formed with an arcuate slot 10a for receiving the guide pin 9. The form of the arcuate slot is so that the distance from the shaft 2 to the slot decreases as the plate 3 is moved to its raised position. As the plate 3 is pivoted by the driving lever 5 from its lowered position in FIG. 1, the pin 9 fixed in the supporting plate 6 of the mirror 7 will be guided by the camming surfaces provided by the arcuate slot 10a to move the mirror relative to the plate 3, the retraction or telescoping of the mirror proving a path of movement for the lower edge of the mirror and its support which will clear the lens mount of any lens which may be mounted on the camera body. A trace of the path of the edge of the mirror is illustrated by the dotted dash line in FIG. 2. When the driving lever 5 is rotated in a clockwise direction to lower the mirror, the camming means provided by the pin 9 and slot 10a will extend the mirror as it is lowered until the plate 3 abuts a stop 11 provided on the cam member 10.

Figure 3:
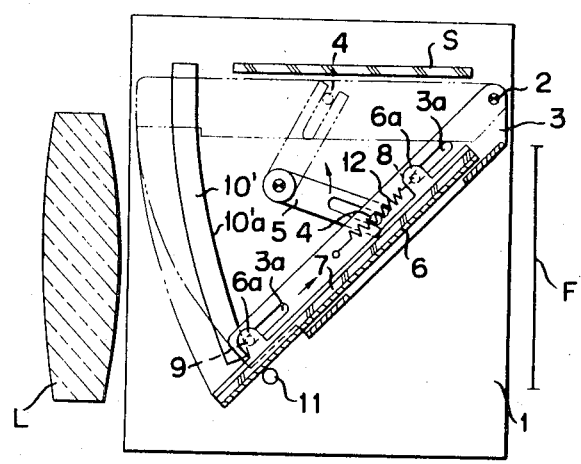
FIG. 3 and FIG. 4 are vertical cross-sectional views showing a second and a third embodiments similar to the embodiment of FIG. 1.

FIG. 3 illustrates a second embodiment of the present invention wherein a cam member 10' provided with a cam surface 10'a is provided. The cam surface is abutted by the pin 9 through the bias of a spring 12 interconnecting the plate 3 and the mirror supporting plate 6. With the raising of the plate 3 by the driving lever 5, the mirror and its support plate are translated relative to the plate 3 against the bias of spring 12; the bias of the spring extending the mirror and its support plate as the plate 3 is lowered.

Figure 4:
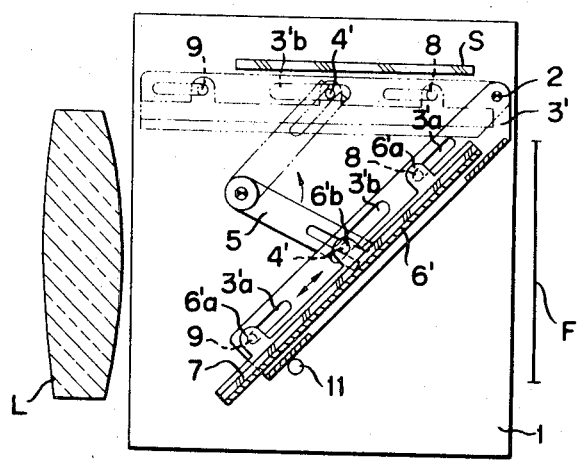

In the third embodiment illustrated in FIG. 4, like reference characters primed are used to designate elements similar to those already described. In this instance the plate 3' is formed with a slot 3'b intermediate the slots 3'a while the mirror supporting plate 6' is provided with an additional projection 6'b. The driving pin 4' is now provided on the projection 6'b, the pin 4' passing through the groove 3'b, and being engaged by the bifurcated end of the driving lever 5.

When the driving lever 5 is rotated counterclockwise, the mirror and its support plate is first retracted and then the plate 3 elevated. Upon clockwise rotation of the driving lever, the reverse operation takes place. It will be appreciated that either the plate 3' or the supporting plate 6' may be used and linked to the driving lever 5.

Figure 5:
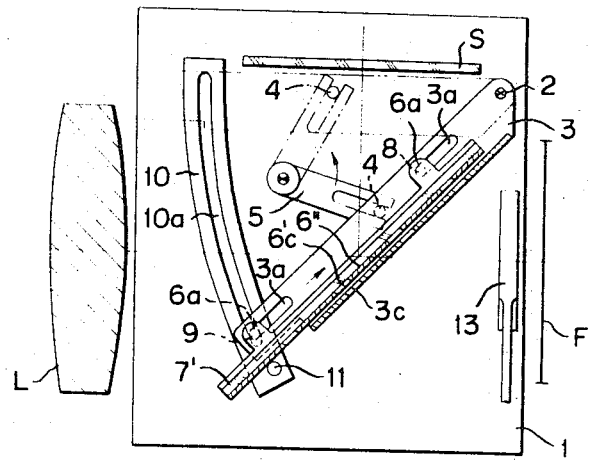
FIG. 5 is a vertical cross-sectional view of the light shielding device of this invention applied to the device for elevating a viewing mirror of FIG. 1 at the reflecting position.
Figure 6:
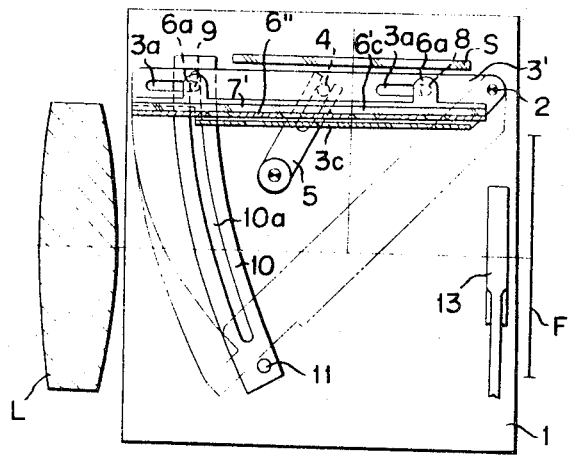
FIG. 6 is a vertical cross-sectional view at the elevated position thereof.

In FIGS. 5 and 6, the mirror mechanism described is provided with means for blocking out any extraneous light which may enter the eyepiece of the viewfinder (not shown) while an exposure is being made. The plate 3' is formed with a plurality of openings 3c while the mirror supporting plate 6'' is formed with similar openings 6c. The openings 3c and 6c are aligned with the mirror in its viewing position (FIG. 5). The mirror being semitransparent or partially transparent, the light rays passing through the lens L will be deflected onto the viewing plate, some of the rays passing through the aligned openings and impinge on a photosensitive element 13 of an exposure meter not otherwise illustrated.

The raising and lowering of the mirror and the retraction and extension of the mirror 7' and its supporting plate 6" is the same as that described in the first embodiment. With the elevation of the mirror 7' from its viewing position in FIGS. 5, the relative translation of the mirror and its supporting plate 6" will close the openings 3c and 6c (FIG. 6) when the mirror is in its raised position to block out any extraneous light.

Figure 7:
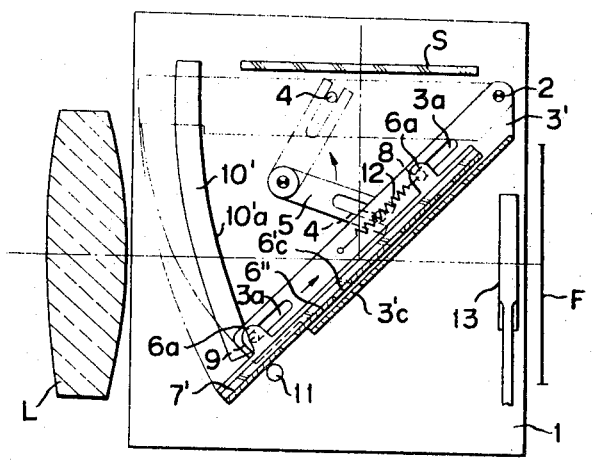
FIG. 7 and FIG. 8 are vertical cross-sectional views of the device for elevating the reflecting mirror of FIG. 3 and FIG. 4, respectively, to which the light shielding device of this invention is applied, at the reflecting position.

FIG. 7 shows an arrangement similar to the embodiment illustrated in FIG. 3. The plate 3' is formed with openings 3'c and the mirror support plate 6" with similar openings 6'c; the openings being aligned with the mirror in its lowered position (FIG. 7) and closed when the mirror is in its elevated position.

Figure 8:
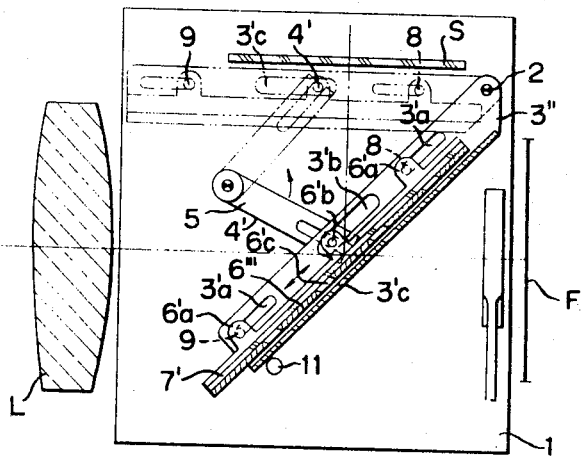

In FIG. 8 an arrangement is illustrated similar to the third embodiment of FIG. 4. The plate 3" is provided with openings 3'c while the mirror support plate 6'" is formed with similar openings 6'c, the openings being aligned when the mirror is in its lowered position and closed with the mirror in its elevated position.

It will thus be seen that a mirror mechanism is provided for pivoting the viewing mirror of a single lens reflex camera by conventional means, the mechanism being of simple construction and compact enough to fit in the presently available or even smaller space provided in such cameras. With the retraction or telescoping of the mirror assembly to clear any lens mount it is possible to provide smaller camera bodies. It is also possible to remodel present cameras wherein shore back focus lenses cannot be used due to the abutment of the mirror against the lens mount to include the retractable mirror assembly. There is also the further advantage with through-the-lens photometric systems to provide a light shielding means to block extraneous light entering the viewfinder eyepiece with the retractable mirror assembly described. Further, the friction generated by the cam guide means described will substantially reduce the shock of impact as the mirror is moved into its lowered or elevated positions.

We claim:

1. A device for raising and lowering the viewing mirror of a single lens reflex camera, comprising:
   a viewing mirror assembly including a pivotable plate pivoted on the camera body, a supporting plate slidably mounted on the pivotable plate and a viewing mirror on said supporting plate;
   driving means for pivoting the pivotable plate between a first position in which the mirror is in its viewing position and a second position in which the mirror is in its elevated position when an exposure is being made, the length of the pivotable plate and of the mirror being so chosen that the mirror edge extends beyond the pivotable plate edge when the mirror is in its viewing position; and
   means activated upon movement of said driving means to pivot said pivotable plate from its first position to its second position for translating the mirror and supporting plate relative to the pivotable plate to retract the mirror edge, said last means extending the mirror and supporting plate when the pivotable plate is moved from its second position to its first position.

2. A device according to claim 1, wherein the translating means for the mirror and supporting plate includes:
   a cam guide secured to the camera body; and
   a pin secured to the supporting plate and received within the cam guide.

3. A device according to claim 1, wherein the translating means for the mirror and supporting plate includes:
   a camming guide surface;
   a pin secured to the supporting plate and abutting the camming guide surface; and
   resilient means interconnecting the pivotable plate and supporting plate extending the two plates and holding the pin against the camming guide surface.

4. A device according to claim 1, wherein the translating means for the mirror and supporting plate includes:
   a pin and slot connection between the pivotable plate and the supporting plate;
   an elongated slot provided in the pivotable plate; and
   a pin secured to the supporting plate and passing through the elongated slot for connection to said driving means.

5. A device according to claim 1, wherein the viewing mirror is semitransparent, and wherein a plurality of openings are provided in the pivotable plate and a plurality of similar openings in the supporting plate, the respective openings being aligned when the mirror is in its viewing position and closed when the mirror is in its elevated position.

6. A device according to claim 2, wherein the viewing mirror is semitransparent, and wherein a plurality of openings are provided in the pivotable plate and a plurality of similar openings in the supporting plate, the respective openings being aligned when the mirror is in its viewing position and closed when the mirror is in its elevated position.

7. A device according to claim 3, wherein the viewing mirror is semitransparent, and wherein a plurality of openings are provided in the pivotable plate and a plurality of similar openings in the supporting plate, the respective openings being aligned when the mirror is in its viewing position and closed when the mirror is in its elevated position.

8. A device according to claim 4, wherein the viewing mirror is semitransparent, and wherein a plurality of openings are provided in the pivotable plate and a plurality of similar openings in the supporting plate, the respective openings being aligned when the mirror is in its viewing position and closed when the mirror is in its elevated position.